United States Patent [19]

Saitou

[11] 4,340,194
[45] Jul. 20, 1982

[54] TAPE CASSETTE

[75] Inventor: Sinichi Saitou, Hachioji, Japan

[73] Assignee: Olympus Optical Co., Ltd., Tokyo, Japan

[21] Appl. No.: 175,712

[22] Filed: Aug. 6, 1980

[30] Foreign Application Priority Data

Aug. 7, 1979 [JP] Japan .......................... 54-108708[U]

[51] Int. Cl.³ ...................... G03B 1/04; G11B 15/32; G11B 23/04
[52] U.S. Cl. .................................... 242/199; 360/132
[58] Field of Search ........ 242/186, 189, 190, 197–200; 360/74, 96, 132, 105

[56] References Cited

U.S. PATENT DOCUMENTS 3,642,225 2/1972 Kakichi et al. ..................... 242/189
3,887,943 6/1975 Katsurayama ....................... 360/96

Primary Examiner—Leonard D. Christian
Attorney, Agent, or Firm—Toren, McGeady & Stanger

[57] ABSTRACT

A cassette tape that can detect when the end of the tape has been reached and possesses a cassette tape case comprised of a window portion for inserting the magnetic head and a window portion for inserting the capstan, a pair of hubs arranged in the cassette case, a tape that is guided along the abovementioned window portion of the cassette case at the same time that it is wound between the two hubs and a tape end detector which can detect the movement of the tape end when the advancing of the tape between the abovementioned hubs is complete.

5 Claims, 4 Drawing Figures

TAPE CASSETTE

BACKGROUND OF THE INVENTION

1. Field of the Invention

This invention involves a cassette tape with a built-in tape end detecting portion.

2. Description of Prior Art

Recently, there has been a trend toward use of a great variety of tapes in tape recorders.

In these kinds of cassette tapes, the magnetic tape that is wound around the supply hub is taken up by the take up hub either by the recording operation of the tape recorder or the reproducing operation and after the tape recording or reproducing is completed, the supply hub and the take up hub run in reverse by means of the rewind function and the tape is rewound at high speed.

However, both ends of the cassette tape are normally fixed by a catch in each of the hubs so that when the advancing of the tape is completed, the tape recorder drive portion is stopped immediately.

Because of this, up until now, the tape recorder itself has been provided with a so-called auto shut-off mechanism. In other words, for example, when the magnetic tape was completely wound and the supply hub stopped turning, this kind of auto shut-off mechanism would utilize the tension applied to the drive portion of the take up hub to automatically stop the tape drive.

However, providing the tape recorder with this kind of mechanism resulted in a higher cost because the structure of the tape recorder became more complex.

SUMMARY OF THE INVENTION

An object of the present invention is to eliminate the above described defect of the cassette tape.

Another object of this invention is to simplify the auto shut-off mechanism of the tape recorder and to offer a tape that can be expected to lower the cost of recorders by allowing accurate detection of the completion of the tape advancing through the provision of a tape end detection portion which can detect the transfer of the tape end portion that accompanies the completion of the tape advancing.

This invention consists of a cassette tape case comprised of a window portion for inserting the magnetic head and a window portion for inserting the capstan, a pair of hubs arranged in the cassette case, a tape that is guided along the abovementioned window portion of the cassette case at the same time that it is wound between the two hubs and a tape end detector which can detect the movement of the tape end when the advancing of the tape between the abovementioned hubs is complete. The tape end detector consists of a fixed bar in the cassette case, a slide bar which slides along the fixed bar when pressure is applied by the movement of the tape end portion and a spring which leans on this slide bar. The slide bar is U-shaped and has a projection which protrudes outside of the cassette case. The tape end detector is placed adjacent to each of the pair of hubs.

DESCRIPTION OF THE PREFERRED EMBODIMENT

Figure 1:
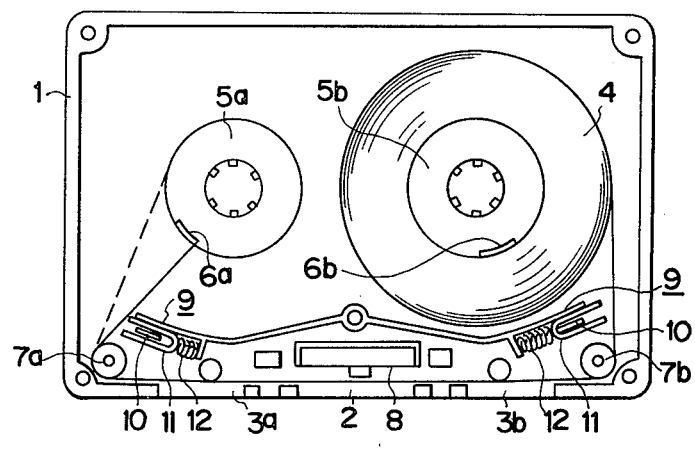
FIG. 1 is a plan view indicating one embodiment of this invention.

In FIG. 1, 1 is the cassette case and this cassette case 1 is constructed so that it is divided into two parts, upper and lower. This cassette case 1 is comprised of a window 2, on one side for inserting the magnetic head and windows 3a and 3b for inserting the pinch rollers. Also, in the central portion of this cassette case 1, a pair of hubs 5a and 5b are lined up and placed. The magnetic tape 4, winds around these hubs 5a and 5b. While both ends of the magnetic tape 4 are affixed to the hubs 5a and 5b by the catches 6a and 6b, it is guided along the windows 2, 3a and 3b of the cassette case 1 by means of the guide rollers 7a and 7b.

A pad spring 8 which faces the window for inserting the magnetic head 2 is provided in the abovementioned cassette case 1. The function of this spring 8 is to have the magnetic tape 4 adhere to the magnetic head with a prescribed pressure.

A pair of tape end detectors 9 are placed adjacent to the abovementioned hubs 5a and 5b. The detector 9 is constructed from a fixed bar 10, a slide bar 11 which is for example, as in the diagram, U-shaped and can slide along the fixed bar 10 and a spring 12 which leans against and applies pressure to the slide bar 11. In this case, the tape end detector 9 is made so that by means of the pressure produced from the movement of the tape and terminus which accompanies the completion of the magnetic tape 4 advancing, the slide bar 11 slides in resistance to the pressure of spring 12.

The slide bar 11 and its projections 13 and 14 are constructed as one body. As indicated in FIG. 2, these projections 13 and 14 are pushed outside by means of the transparent holes 15 and 16 in the cassette case 1.

Figure 2:
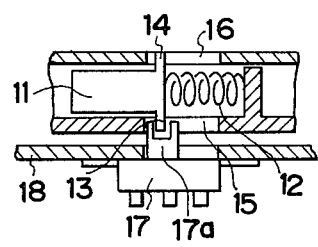
FIG. 2 is a cross-sectional view of the main parts of the same embodiment.

The cassette tape constructed in this way will be loaded in the cassette chamber 18 of the tape recorder as indicated in FIG. 2. In this case, a switch 17, for example a sliding type for the end detector which responds to the abovementioned tape end detector 9 is provided in the cassette chamber 18 and the abovementioned slide bar 11 of the tape end detector 9 is connected to the operating bar 17a of this switch 17. The function of this switch 17 is to stop the tape drive portion of the tape recorder.

Next, the operation of the cassette tape constructed in the above fashion will be described.

First, the cassette tape is loaded into the tape recorder cassette chamber 18 as indicated in FIG. 2 and the projection 13 from the slide bar 11 of the tape end detector 9 is connected to the operating bar 17a of the switch 17 for the tape detector.

Figure 3:
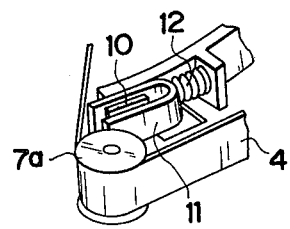
FIG. 3 is an oblique diagram depicting the operation of the same embodiment.

In this condition, during recording or reproducing, the magnetic tape 4 that is wound around the supply hub, for example hub 5a begins to advance around the take-up hub, for example hub 5b. After that, when the magnetic tape 4 around the supply hub 5a advances completely as indicated in FIG. 1, the terminus of the magnetic tape 4 moves from the position indicated by broken lines in the diagram to the position indicated by solid lines. In this case, because the terminus of the magnetic tape 4 moves while it is being pulled by the advance power of the take-up hub 5b, pressure is applied to the end of the slide bar 11 in the tape end detector 9 as indicated in FIG. 3. Whereupon, the slide bar 11 moves along the fixed bar 10 and slides as it compresses the spring 12. Because of this, in accompaniment to the sliding of the slide bar 11, the switch 17 for the tape recorder's end detector goes into operation through the projection 13 and the tape drive portion on the take-up side stops immediately.

Next, when the recording or reproducing of the magnetic tape 4 is completed and the supply hub 5a and the advance hub 5b are run in reverse for the rewind operation, this time the magnetic tape 4 which is wound around hub 5b is taken up by hub 5a. Then, when the magnetic tape 4 wound around hub 5b is completely taken up, the slide bar 11 of the tape end detector 9 will slide because of the pressure from the movement of the terminus of the magnetic tape 4 in the same manner as described above. With this, the switch 17 for the end detector of the tape recorder will go into operation and the tape drive portion of the take-up side will stop immediately.

The operations can be accomplished in the same manner as described above when the cassette tape has been turned over to the other side.

Accordingly, because of this kind of construction, since the completion of the tape advancing can be accurately detected by means of the tape end detector which uses the pressure from the movement of the tape terminus and consists simply of a fixed bar, a sliding bar and a spring, the auto shut-off mechanism in a tape recorder that uses this kind of cassette tape can be greatly simplified in comparison to the previous recorders and in terms of the cost, a lower price can be expected.

Figure 4:
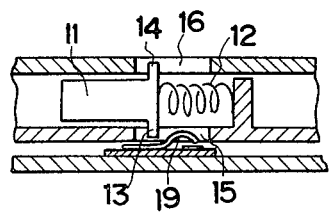
FIG. 4 is a cross-sectional view of the main parts of another embodiment of this invention.

Furthermore, this invention is not only limited to the application example stated above but can be implemented in a variety of ways so long as the essential points are not changed. For example, in the above application a sliding type switch was used for the end detector switch but a contact point type switch 19 as indicated in FIG. 4 can also be used.

While specific embodiments of the invention have been shown and described in detail to illustrate the application of the inventive principles, it will be understood that the invention may be embodied otherwise without departing from such principles.

What is claimed is:

1. A tape cassette comprising: a window means for enabling operative engagement in said cassette of magnetic head means and capstan means; a pair of hubs arranged in said cassette; a tape wound between said hubs guided along said window means for operative engagement by said magnetic head means; and tape end detector means for detecting when unwinding of said tape from either of said hubs is completed; said tape end detector means comprising a fixed bar set in said cassette, a slide bar adapted to be engaged by said tape upon termination of the unwinding thereof from one of said hubs, said slide bar being thereby slidably moved relative to said fixed bar, and spring means urging said slide bar against movement imparted thereto by engagement with said tape.

2. A cassette according to claim 1 wherein said slide bar is formed with a U-shaped configuration.

3. A cassette according to claim 1 wherein said slide bar is formed with projections which protrude outwardly of said cassette.

4. A cassette according to claim 1 wherein said tape end detector means include a tape end detector placed adjacent each of said pair of hubs.

5. A cassette according to claim 1 wherein said slide bar is adapted to actuate means for terminating rotation of at least one of said hubs.

* * * * *